United States Patent [19]

Sciulli

[11] 3,890,467

[45] June 17, 1975

[54] DIGITAL VOICE SWITCH FOR USE WITH DELTA MODULATION

[75] Inventor: Joseph A. Sciulli, Rockville, Md.

[73] Assignee: Communications Satellite Corporation, Washington, D.C.

[22] Filed: Nov. 1, 1973

[21] Appl. No.: 411,878

[52] U.S. Cl. .......................... 179/1 VC; 179/15 AS

[51] Int. Cl. .......................................... H04b 15/00

[58] Field of Search......... 179/1 VC, 15 AS, 18 BC; 325/38 B; 332/9 R; 179/15 AP

[56] References Cited

UNITED STATES PATENTS

| | | | |
|---|---|---|---|
| 2,897,275 | 7/1959 | Bowers | 325/38 B |
| 3,249,870 | 5/1966 | Greefkes | 179/15 AP |
| 3,706,944 | 12/1972 | Tewksbury | 325/38 B |
| 3,712,959 | 1/1973 | Fariello | 179/1 VC |

*Primary Examiner*—Kathleen H. Claffy
*Assistant Examiner*—Tommy P. Chin
*Attorney, Agent, or Firm*—Sughrue, Rothwell, Mion, Zinn and Macpeak

[57] ABSTRACT

A digital voice switch which is compatible with continuously variable slope delta modulation communication systems is disclosed. Delta modulation is a differential encoding scheme which subtracts the amplitude of the correction voltage from the current amplitude of the input speech signal. If this difference is positive, the quantizer emits a binary "1" and, if negative, a "0". The output of the quantizer is transmitted as well as fed back through an integrator which synthesizes a stepped waveform correction voltage. In a continuously variable slope delta modulation system, the output of the quantizer is also fed back through a digital level detector in an adaptive feedback loop. The output of the level detector is a gate voltage which is "high" for a time which is proportional to the depth of modulation. This voltage is then passed through a low pass filter which then produces a voltage proportional to the time that the gate voltage is high. This voltage is used to control a pulse amplitude modulator in such a way as to keep the depth of modulation nearly constant. The output of the modulator is integrated to produce the synthesized correction voltage. This process adjusts the amplitude of the correction pulse which thereby changes the amplitude of the synthesized correction voltage as a function of the rate of change of the input speech signal. Essentially, this amounts to introducing companding into the system with the encoder providing compression and the decoder providing expansion. At the onset of speech, the adaptive feedback loop attempts to rapidly adapt the amplitude of the correction pulse to the amplitude of the speech signal. This results in a concentration or burst of 1's appearing at the output of the level detector. The digital voice switch continuously examines the output of the level detector for the occurrence of four consecutive 1's which causes the switch to operate thereby enabling transmission.

6 Claims, 2 Drawing Figures

DIGITAL VOICE SWITCH FOR USE WITH DELTA MODULATION

BACKGROUND OF THE INVENTION

1. Field of the Invention

The present invention generally relates to pulse communication systems, and more particularly to a digital voice switch for use with delta modulation systems.

2. Description of the Prior Art

Delta modulation (DM) is a differential pulse code modulation (PCM) or a 1-digit code PCM. Whereas in PCM systems an n-digit binary code is used to transmit information, in a DM system, a code comprising only one digit is used. In effect, the transmitted pulses carry the message information corresponding to the derivative of the amplitude of the message function, and at the receiving end, these pulses are integrated to obtain the original waveform. Thus, only the changes in signal amplitude from one sampling time to the next sampling time are transmitted.

The basic DM system is essentially a quantized feedback system producing a differential encoding which subtracts the amplitude of a correction voltage from the current amplitude of the input speech signal. The DM includes a quantizer which receives a source of pulses from a pulse generator or clock and generates an output bit stream consisting of a series of binary 1's and 0's generated at the constant clock rate. This output is both transmitted and fed back through an integrator in the feedback loop which synthesizes a waveform consisting of a series of unit steps up and down. This synthesized waveform is then compared with the original message signal by a comparator. If the output of the comparator is positive, the quantizer emits a binary 1, and if negative, a binary 0.

At the receiver, the DM pulse train is again integrated to produce a voltage which consists of the original message function plus noise components due to sampling. These latter components are eliminated by a low pass filter resulting in a reconstructed signal that is a close replica of the original modulating message signal. The difference between the original and reconstructed signals gives rise to "quantizing noise" which can be decreased by increasing the pulse frequency of the encoding pulse generator or clock.

In a DM system, the information contained in the transmitted pulses is mainly correlated to changes in input signal amplitude rather than to the absolute value of the amplitude. Since the synthesized wave can change only one level per clock pulse, a DM system overloads when the slope of the input speech signal is too large. The largest slope the system can accurately reproduce is one changing by one level or step every pulse interval.

In order to avoid this problem, continuously variable slope delta modulation (CVSD) systems have been developed. In a variable slope delta modulator, in order to keep the depth of modulation nearly constant, the amplitude of the correction voltage is changed as a function of the rate of change of the input speech signal so that the amplitude of the correction voltage approximates the amplitude of the speech signal. One characteristic of a variable slope delta modulator is that at the onset of speech, the adaptive loop of the modulator attempts to rapidly adapt the amplitude of the correction signal to the amplitude of the speech signal which results in a concentration or "burst" of binary 1's appearing at the output of the modulator.

It has long been recognized that during conversations speech signals are present only during 30–40 percent of the time. The remaining time is occupied by pauses or tones too faint to be intelligible. Advantage can be taken of this fact to improve communication system efficiency by energizing a transmitter, in response to a speech detector output, only during those periods when meaningful speech signals are present, thereby effecting a significant power savings.

Most prior art speech detectors are analog rather than digital in nature and measure the RMS value of the input signal. A threshold level is chosen, and when the RMS value of the input signal exceeds this level, an output signal is produced to indicate the presence of speech. Speech detectors of this type suffer two major disadvantages. First, they require relatively long delays after the commencement of speech before an output is produced. This is due to the fact that such detectors involve an integration or storage function, and it takes a certain amount of time for the RMS value of the signal to build up to a level above the threshold. This results in clipping off the initial portions of sounds and giving them a sharp quality which introduces undesired distortion in communication systems triggered by the speech detector output.

Second, the detection threshold of prior art speech detectors must be set at a considerably low level in order to properly respond to all of the meaningful intelligence in the speech signal and to maintain good speech quality. As a result of the low threshold level, extraneous noise signals often trigger the detectors, which introduces further distortion into the system and cancels out some of the desired power savings.

In recent years, excellent voice switch designs have evolved for PCM encoded speech signals. One such design is disclosed in U.S. patent application Ser. No. 19,184 filed Mar. 13, 1970 now U.S. Pat. No. 3,712,959 and entitled "Method and Apparatus for Detecting Speech Signals in the Presence of Noise" by E. Fariello. However, there are no known digitally controlled voice adaptive switches for use with DM encoded speech signals.

SUMMARY OF THE INVENTION

It is therefore an object of this invention to provide a digital voice switch for use with continuously variable slope delta modulation systems.

According to the present invention, the foregoing and other objects are obtained by providing a digital voice switch which continuously examines the output bit stream of the digital level detector and the adaptive feedback loop of a CVSD. When the switch detects the occurrence of a predetermined number of consecutive binary 1's, the switch operates thereby enabling transmission. The switch is extremely simple and produces no perceptible front-end clipping.

DESCRIPTION OF THE PREFERRED EMBODIMENT

Figure 1:
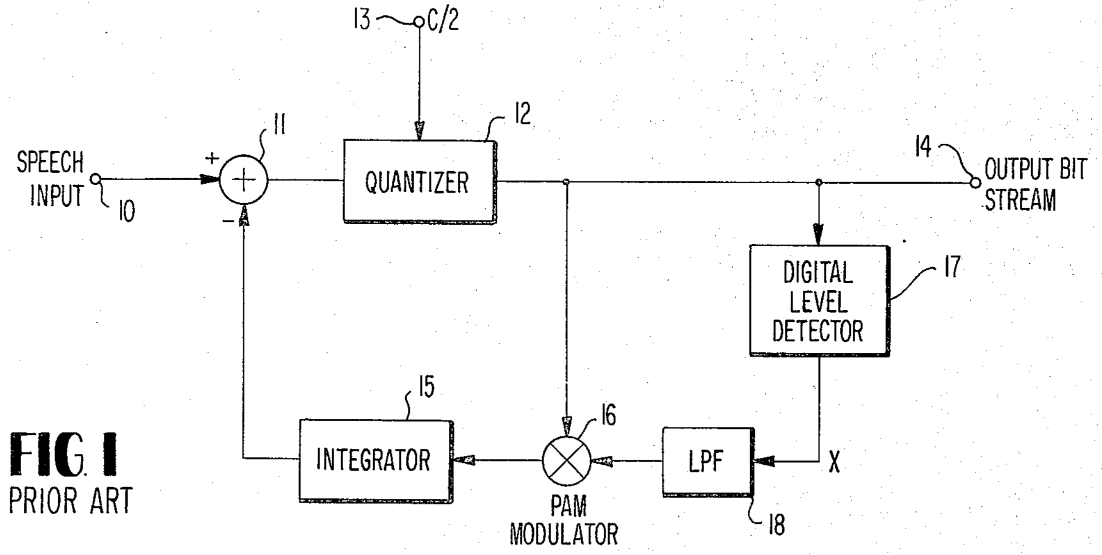
FIG. 1 PRIOR ART
FIG. 1 is a block diagram of a prior art variable slope delta modulation encoder.

Referring now to FIG. 1 of the drawings which illustrates a typical prior art variable slope modulator, the speech input to be encoded is applied to input terminal 10 which in turn, is connected to the positive input of comparator 11. Comparator 11 could be, for example, a differential amplifier which produces an output voltage equal to the difference between its two input voltages. The output of comparator 11 is connected to one input of quantizer 12 having a second input connected to terminal 13 connected to receive pulses at a clock rate of C/2. Quantizer 12 produces an output bit stream at the clock rate C/2 and consisting of a series of binary 1's and 0's. If the difference voltage produced by the output of comparator 11 is positive, quantizer 12 emits a binary 1, and if negative, the quantizer emits a binary 0. The output bit stream from quantizer 12 is connected to output terminal 14 for ultimate transmission and is also connected to the feedback loop for developing the second input voltage to the comparator 11.

In the standard DM system, the output bit stream from quantizer 12 is connected to an integrator 15 to synthesize an output voltage which is connected to the negative input terminal of comparator 11. The resulting waveform of the output voltage of integrator 15 consists of a series of unit steps up and down. This waveform is then compared with the original message signal at input terminal 10 by comparator 11. The feedback system tends to reduce the difference voltage at the output of comparator 11 so that the synthesized signal at the output of integrator 15 is in the form of a step wave which follows the message signal at input terminal 10.

In order to avoid overloading of the DM when the slope of the speech signal at input terminal 10 is too large, an adaptive feedback loop is provided to adjust the size of the step in the synthesized waveform in order to more accurately track the input speech signal to be encoded. This adaptive loop includes a pulse amplitude modulator 16 connected between the output of quantizer 12 and integrator 15. Pulse amplitude modulator 16 may, for example, be a transconductance amplifier with amplitude control and operates to adjust the amplitude of the pulse input to integrator 15 thereby varying the slope of the synthesized waveform supplied to the negative input terminal of comparator 11. The control voltage for the pulse amplitude modulator is developed by a digital level detector 17 connected to the output of quantizer 12 and a low pass filter 18 connected to the output of detector 17 for generating the control voltage for the pulse amplitude modulator 16. The digital level detector 17 continuously examines the output bit stream for the occurrence of four consecutive 1's. The output of the digital level detector 17 is a gate voltage which is " high" for a time which is proportional to the depth of modulation. This voltage is effectively integrated by low pass filter 18 to produce a voltage proportional to the time that the gate voltage is high. The resulting control voltage is used to control the pulse amplitude modulator 16 in such a way as to keep the depth of modulation nearly constant. This process adjusts the amplitude of the correction pulse at the input to integrator 15 which thereby changes the amplitude of the correction voltage at the negative input of comparator 11 as a function of the rate of change of the input speech signal.

The key to the design of the digital voice switch according to the invention is that the output of the digital level detector 17 at point X goes high rather rarely and randomly during silence but it delivers concentrated bursts of binary 1's during speech. This is true because the relatively low level noise present during silence does not produce a predominance of 1's in the output bit stream so that the occurrence of, for example, four consecutive binary 1's at random is rather unlikely. At the onset of speech, however, the adaptive feedback loop attempts to rapidly adapt the amplitude of the correction pulse to the amplitude of the speech signal. This results in a concentration or burst of binary 1's appearing at the output of the level detector 17. The operation of the present invention therefore depends on the detection of concentrations or bursts of pulses at the output of the level detector 17 in order to distinguish between speech and silence.

Figure 2:
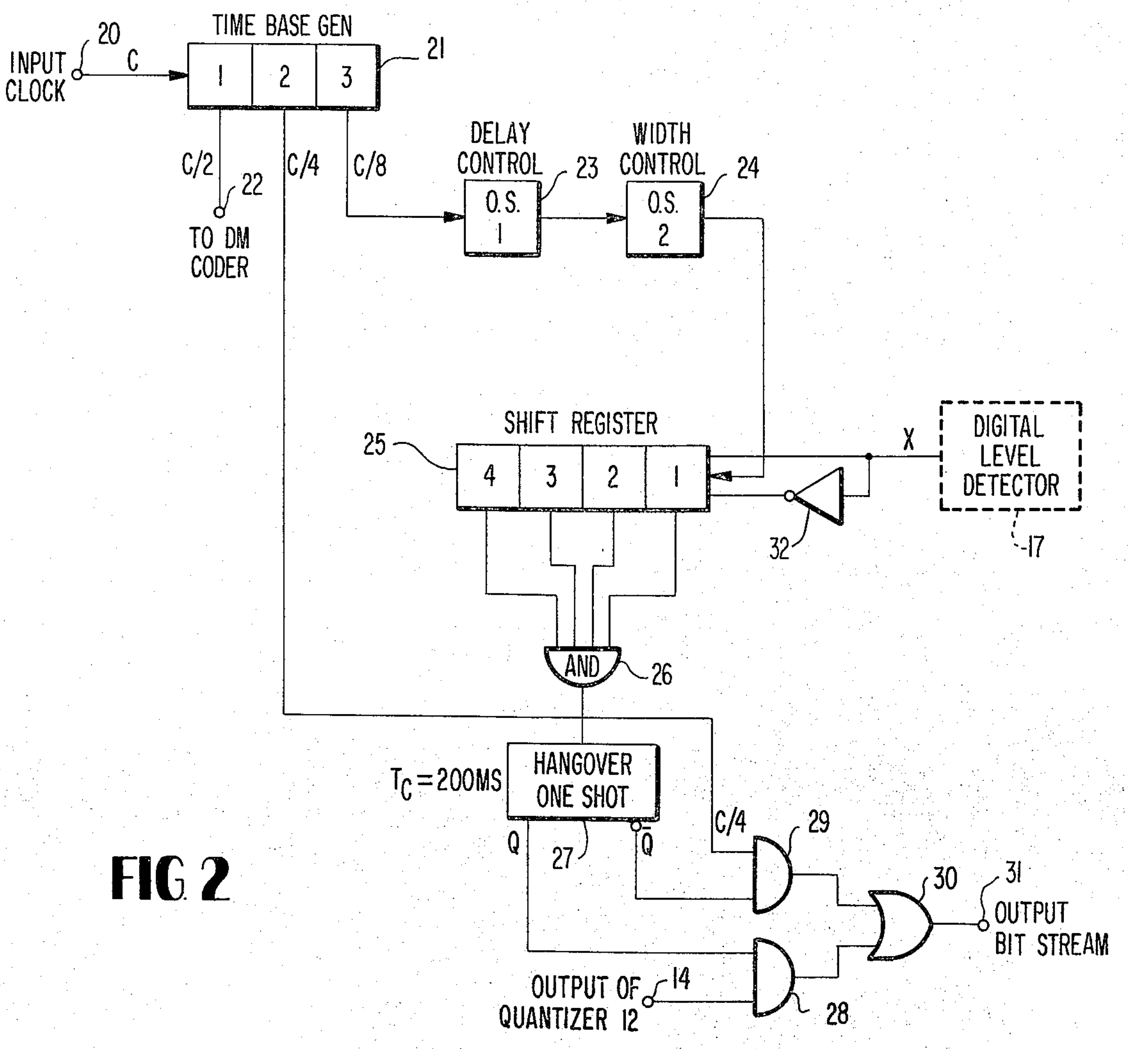
FIG. 2 is a block and logic diagram of the digital voice switch according to the invention which is compatible with encoders of the type illustrated in FIG. 1.

Referring now to FIG. 2 of the drawing, the preferred embodiment of the digital voice switch according to the invention is illustrated. An input clock C having a rate equal to twice the sampling rate desired for the DM is supplied to input terminal 20 of the time base generator 21. Time base generator 21 is preferably a three stage binary counter producing at the output terminal 22 of its first stage a clock rate of C/2 which is used as the fundamental sampling clock for the DM. The output of the third stage of counter 21 having a rate of C/8 is connected to one-shot multivibrators 23 and 24 connected in series. The first one-shot 23, provides delay control, while the second one-shot 24, provides width control of a clock signal supplied to a shift register 25. The output of digital level detector 17 and its complement generated by inverter 32 are connected to the input stage of shift register 25. If the output of digital level detector 17 is high, indicating the detection of four consecutive binary 1's in the output bit stream, at the time of a clock signal from one-shot 24, then a binary 1 is gated into the first stage of shift register 25. Otherwise, a binary 0 is gated into the first stage of the shift register. As illustrated, shift register 25 is comprised of four stages, although a greater or lesser number of stages may be used. When all the stages of shift register 25 contain binary 1's, the AND gate 26 emits a pulse which fires the hangover one-shot multivibrator 27. The one-shot 27 has a time constant of approximately 200ms which generates the hangover time generally required for a voice switching device. When the Q output of one-shot 27 is high, active speech is indicated, and AND gate 28 is enabled to pass the output bit stream of quantizer 12. Conversely, if the Q output is high representing silence, the AND gate 29 is enabled. AND gate 29 has its second input connected to the output of the second stage of counter 21. The output of this stage has a rate of C/4 and is a square wave at one-half the sampling rate C/2. It is necessary to pass this square wave through AND gate 29 during silence since in a DM system no signal at the analog input results in a one-zero (square wave) bit pattern in the output bit stream. The outputs of AND gates 28 and 29 are connected to OR gate 30 which in turn, is connected to the output terminal 31.

The use of four consecutive level detector pulses works well for bit rates between 40 and 64 kbit/sec. However, for lower rates, the number of consecutive level detector pulses required to turn on the switch should be less. This is reasonable because four consecutive level detector pulses actually represents 16 sampling intervals; therefore, as the sampling rate is decreased, the minimum turn-on time would correspondingly increase.

It will be apparent that the embodiment shown is only exemplary and that various modifications can be made in construction and arrangement within the scope of the invention as defined in the appended Claims.

I claim:

1. A digital voice switch for use in a speech communication system including a continuously variable delta modulator having comparator means for comparing an input speech signal to be encoded and a synthesized feedback signal and producing a difference signal, quantizing means for receiving said difference signal and a clock signal and generating an output bit stream consisting of binary 1's and 0's for transmission by said communication system, a binary 1 being produced when said difference signal is positive and a binary 0 being produced when said difference signal is negative, feedback integrator means connected to receive said output bit stream for producing said synthesized feedback signal having a stepped waveform, and an adaptive feedback control means including a digital level detector connected to receive said output bit stream and producing an output on the detection of a first predetermined number of consecutive 1's in said output bit stream, low pass filter means connected to receive the output of said digital level detector to produce a control voltage, and a pulse amplitude modulator controlled by said control voltage for modulating the input to said feedback integrator means, said digital voice switch being connected to said digital level detector and comprising:

means for detecting a second predetermined number of consecutive binary 1's in said output bit stream by sampling the output of said digital level detector; and means responsive to said detecting means for gating said output bit stream for transmission by said communications system whenever said second predetermined number of consecutive 1's is detected.

2. The digital voice switch as recited in claim 1 wherein said means for detecting comprises:

clock means responsive to said clock signal providing clock pulses at a rate inversely proportional to said predetermined number, shift register means connected to receive the output of said digital level detector and shifting in response to said clock pulses, and an AND gate connected to a selected number of stages of said shift register means and providing an output whenever each of said selected number of stages contains a binary 1.

3. The digital voice switch as recited in claim 2 wherein said means for detecting further comprises delay means connected to the output of said AND gate for maintaining an output signal to said gating means for a predetermined period of time after said second predetermined number of consecutive 1's is detected.

4. The digital voice switch as recited in claim 3 wherein said delay means is a one shot multivibrator providing a gating signal to said gating means and further comprising means responsive to the absence of said gating signal for generating and gating a square wave signal having a frequency of one-half of said clock rate for transmission by said communication system.

5. The digital voice switch as recited in claim 1 wherein said detecting means includes delay means for maintaining an output signal to said gating means for a predetermined period of time after said predetermined number of consecutive 1's is detected.

6. The digital voice switch as recited in claim 1 further comprising second means responsive to said detecting means for generating and gating a square wave signal having a frequency of one-half of said clock rate for transmission by said communication system in the absence of said output signal from said detecting means.

* * * * *

UNITED STATES PATENT OFFICE

CERTIFICATE OF CORRECTION

PATENT NO. : 3,890,467

DATED : June 17, 1975

INVENTOR(S) : JOSEPH ALBERT SCIULLI

It is certified that error appears in the above-identified patent and that said Letters Patent are hereby corrected as shown below:

Column 4

Line 53, delete "Q" and insert --$\bar{Q}$--

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*